United States Patent
Lim et al.

(10) Patent No.: US 11,746,009 B2
(45) Date of Patent: Sep. 5, 2023

(54) PROCESS FOR START-UP OF AN AUTOTHERMAL REFORMER

(71) Applicant: L'Air Liquide, Société Anonyme pour l'Etude et l'Exploitation des Procédés Georges Claude, Paris (FR)

(72) Inventors: Chin Han Lim, Frankfurt am Main (DE); Hans Kopetsch, Bad Homburg (DE); Veronika Gronemann, Karben (DE)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 167 days.

(21) Appl. No.: 17/125,540

(22) Filed: Dec. 17, 2020

(65) Prior Publication Data

US 2021/0188632 A1 Jun. 24, 2021

(30) Foreign Application Priority Data

Dec. 19, 2019 (EP) ..................................... 19020711

(51) Int. Cl.
  *C01B 3/34* (2006.01)
  *B01J 19/00* (2006.01)
(52) U.S. Cl.
  CPC ............ *C01B 3/346* (2013.01); *B01J 19/0013* (2013.01); *B01J 2219/00128* (2013.01);
  (Continued)
(58) Field of Classification Search
  CPC ............ C01B 3/346; C01B 2203/0233; C01B 2203/244; C01B 2203/0811;
  (Continued)

(56) References Cited

U.S. PATENT DOCUMENTS

| 9,464,237 B2 | 10/2016 | Dahl et al. |
| 10,106,405 B2 | 10/2018 | Dahl et al. |

(Continued)

FOREIGN PATENT DOCUMENTS

| EP | 0 936 182 | 8/1999 |
| EP | 1 400 489 | 3/2004 |

(Continued)

OTHER PUBLICATIONS

European Search Report and Written Opinion for corresponding EP 19020711, dated Jun. 10, 2020.

*Primary Examiner* — Douglas B Call
(74) *Attorney, Agent, or Firm* — Elwood L. Haynes

(57) ABSTRACT

The invention relates to a process for the start-up of an autothermal reformer, wherein syngas is produced in the autothermal reformer during start-up through steam reforming. To facilitate autoignition in the autothermal reformer reactor of the autothermal reformer, the reformed syngas is recycled to an upstream section of the autothermal reformer reactor and is mixed with process steam and a hydrocarbon containing process stream. As soon as a minimum hydrogen threshold concentration at the upstream section of the autothermal reformer reactor is reached in the mixed process stream, oxygen is added to the burner of the ATR reactor to obtain autoignition of the mixed process stream. Due to the process of the invention, an external hydrogen source for facilitating autoignition of the mixed stream can be omitted. The invention further relates to a plant configured to carry out the process of the invention.

14 Claims, 2 Drawing Sheets

(52) U.S. Cl.
    CPC ............... *B01J 2219/00157* (2013.01); *C01B 2203/0233* (2013.01); *C01B 2203/0244* (2013.01); *C01B 2203/0811* (2013.01); *C01B 2203/1235* (2013.01); *C01B 2203/1604* (2013.01)

(58) Field of Classification Search
    CPC ...... C01B 2203/1235; C01B 2203/1604; B01J 19/0013; B01J 2219/00128; B01J 2219/00157
    USPC ........................................................ 252/373
    See application file for complete search history.

(56) References Cited

U.S. PATENT DOCUMENTS

| | | | | |
|---|---|---|---|---|
| 2004/0057898 | A1* | 3/2004 | Singh ................. | C01B 3/382 |
| | | | | 423/652 |
| 2013/0345324 | A1* | 12/2013 | Knudsen ................ | B01J 19/245 |
| | | | | 422/628 |
| 2014/0001408 | A1* | 1/2014 | Johanning ............. | C01B 3/382 |
| | | | | 252/373 |
| 2016/0115021 | A1* | 4/2016 | Gronemann ........... | B01J 19/245 |
| | | | | 422/162 |

FOREIGN PATENT DOCUMENTS

| | | | |
|---|---|---|---|
| WO | WO 01 25140 | | 4/2001 |
| WO | WO2014184022 | * | 11/2014 |

* cited by examiner

PROCESS FOR START-UP OF AN AUTOTHERMAL REFORMER

CROSS REFERENCE TO RELATED APPLICATIONS

This application claims the benefit of priority under 35 U.S.C. § 119 (a) and (b) to European Application No. EP 19020711.8, filed Dec. 19, 2019, the entire contents of which are incorporated herein by reference.

TECHNICAL FIELD

The invention relates to a process for the start-up of an ATR (autothermal reformer). The invention further relates to a plant configured to carry out said process.

BACKGROUND ART

Synthesis gas, also referred to as "syngas", is a mixture of primarily hydrogen ($H_2$), carbon monoxide (CO) and often some carbon dioxide ($CO_2$). Carbon monoxide and carbon dioxide can be collectively referred to as "carbon oxides". Autothermal reforming is one of the most efficient ways to produce synthesis gas which is rich in carbon oxides. In the autothermal reforming process, oxygen and steam is used in a reaction with methane ($CH_4$) to form synthesis gas. The methane source is usually natural gas (NG), which has a high methane content. Other hydrocarbon containing feedstocks for ATR can be refinery offgas, pre-reformed gas, Fischer-Tropsch tail-gas, Liquefied Petroleum Gas (LPG) or naphta. Depending on the source, a pre-reforming step is required to produce methane from heavier hydrocarbons.

The reaction of the autothermal reforming process takes place in a single reactor, where the methane is partially oxidized and subsequently subjected to a catalytic reforming step, according to the reaction

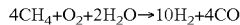

$$4CH_4 + O_2 + 2H_2O \rightarrow 10H_2 + 4CO$$

for the ideal case, where no $CO_2$ as a side product is obtained.

For the partial oxidation reaction in the ATR reactor, a burner is used. Therefore, the ATR reactor has to be heated up to high temperatures such as 800-1000° C. To ease autoignition of the hydrocarbon and oxygen containing feedstock gas mixture, hydrogen can be added to said feedstock. Thereby, the autoignition temperature can be lowered to e.g. 450-600° C., as described in U.S. Pat. No. 10,106,405.

The hydrogen is supplied as a hydrogen rich gas stream, which is either pure hydrogen or a gas stream with a high hydrogen concentration. Usually the hydrogen rich gas stream is introduced from an external source. The external source for the hydrogen rich gas stream can be a neighbouring plant that has either an excess hydrogen rich gas stream or a hydrogen generation unit, such as a pressure swing absorption unit.

Depending on the configuration of an ATR comprising plant and neighbouring plant, no external source for hydrogen may be available to ease autoignition of the ATR reactor. Providing a dedicated hydrogen source only for the purpose of start-up of the ATR reactor may not be appropriate for economic reasons.

SUMMARY

It is therefore an object of the present invention to provide a process and a plant for the start-up of an ATR (autothermal reformer), which solves the above mentioned technical problem.

In particular, an object of the present invention is to provide a process for the start-up of an ATR, which does not require an external hydrogen source.

A contribution to the at least partial solution of at least one of the above mentioned objects is provided by the subject-matter of the independent claims. The dependent claims provide preferred embodiments which contribute to the at least partial solution of at least one of the objects. Preferred embodiments of elements of a category according to the invention shall, if applicable, also be preferred for components of same or corresponding elements of a respective other category according to the invention.

The terms "having", "comprising" or "containing" etc. do not exclude the possibility that further elements, ingredients etc. may be comprised. The indefinite article "a" or "an" does not exclude that a plurality may be present.

In general, the problem is at least partially solved by a process for the start-up of an ATR (autothermal reformer), the ATR comprising an ATR reactor with a burner, said process comprising the steps of heating an inert gas by a heating means, and introducing the heated inert gas in a circulation loop containing the ATR reactor;

heating a mixture of inert gas and process steam by a heating means, and introducing the heated mixture of inert gas and process steam in the circulation loop containing the ATR reactor;

introducing heated process steam in the circulation loop as soon as a minimum outlet threshold temperature of the ATR reactor is reached, whereby inert gas is removed from the circulation loop;

heating a hydrocarbon containing process stream by a heating means, and introducing the heated hydrocarbon containing process stream into the ATR reactor, whereby a syngas stream containing carbon oxides and hydrogen is produced in the ATR reactor through steam reforming;

cooling the produced syngas stream to separate water from the syngas stream as process condensate, whereby a dry syngas stream is obtained;

recycling a fraction of the dry syngas stream from a downstream section of the ATR reactor to an upstream section of the ATR reactor; whereby a mixed process stream is obtained at the upstream section of the ATR reactor, the mixed process stream containing the process steam, the hydrocarbon containing process stream and the recycled dry syngas stream;

introducing the mixed process stream to the burner of the ATR reactor;

introducing an oxygen containing process stream to the burner of the ATR reactor as soon as a minimum hydrogen threshold concentration in the mixed stream at the upstream section of the ATR reactor is reached; whereby autoignition of the mixed process stream is obtained; and operating the ATR to produce syngas through autothermal reforming.

The aforementioned process steps do not necessarily have to be carried out in the order specified.

According to the invention, a dry syngas stream containing hydrogen is recycled from a downstream to an upstream section of the ATR reactor. As the ATR reactor contains a catalyst for the endothermic steam reforming type reaction, according to

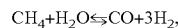

$$CH_4 + H_2O \leftrightarrows CO + 3H_2,$$

a small quantity of hydrogen containing synthesis gas can thus be produced without the partial oxidation proportion of the autothermal reforming reaction. The synthesis gas is dried by cooling and condensing excess steam as water downstream the ATR reactor, before it is recycled to the upstream section of the ATR reactor.

"Upstream section of the ATR reactor" means any section or area of the ATR reactor (reactor of the autothermal reformer) which is upstream to the ATR reactor. In one embodiment, the upstream section of the ATR reactor is the inlet of the ATR reactor.

"Downstream section of the ATR reactor" means any section or area of the ATR reactor (reactor of the autothermal reformer) which is downstream to the ATR reactor. In one embodiment, the downstream section of the ATR reactor is the outlet of the ATR reactor.

By producing a certain quantity of hydrogen containing dry synthesis gas via steam reforming in the ATR reactor, and recycling said dry synthesis gas to the upstream section of the ATR reactor, an external hydrogen source for facilitating autoignition of the feedstock gas mixture in the ATR reactor is no longer required.

Autoignition is obtained by adding oxygen to the pre-heated mixed process stream, which is introduced to the ATR reactor and which comprises process steam, the hydrocarbon containing process stream and the recycled dry syngas stream. In one embodiment, the hydrocarbon containing process stream is a natural gas containing process stream, or it consists of natural gas.

The present invention is directed to the start-up phase of the ATR. After the start-up phase, the ATR is operated under usual conditions. Those conditions are also referred to as "steady state" conditions for continuously producing syngas through autothermal reforming, and which are well-known to the skilled person.

The start-up phase is preferably initialized by flushing the ATR with an inert gas, which is heated by a heating means and circulated in a circulation loop containing the ATR reactor. In one embodiment, the inert gas is nitrogen ($N_2$).

Preferably afterwards, process steam is introduced to the ATR, whereby a mixture of process steam and inert gas results, which is again heated and circulated in a circulation loop containing the ATR reactor. Once the outlet temperature of the ATR reactor exceeds a predefined minimum threshold value, the supply of inert gas is stopped, and the inert gas is removed from the circulation loop, whereby the steam concentration in the circulation loop gradually increases. After a certain time, solely steam is flowing in the system continuously.

Preferably afterwards, a pre-heated hydrocarbon process stream is introduced into the ATR reactor. Due to the elevated temperatures of the pre-heated hydrocarbon process stream, which also results in an elevated ATR reactor temperature, some endothermic reforming reaction will take place in the ATR reactor, whereby hydrogen containing syngas is produced.

The syngas stream thus obtained is cooled to separate water from it as process condensate. In one embodiment, the outlet of the ATR reactor is cooled to knock off the excess steam.

A fraction of the dry syngas stream is recycled in the circulation loop to the upstream section of the ATR reactor. In one embodiment, the upstream section of the ATR reactor is the inlet of the ATR reactor. By recycling syngas to the upstream section of the ATR reactor, a mixed process stream is obtained at said upstream section, the mixed process stream comprising process steam, the hydrocarbon containing process stream and the recycled syngas. The mixed process stream is introduced to the burner of the ATR reactor.

As soon as a predefined minimum threshold value for the hydrogen concentration at the upstream section of the ATR reactor is reached, also oxygen is introduced to the burner of the ATR reactor. Thereby autoignition of the mixed process stream is obtained. After autoignition, partial oxidation of the hydrocarbon containing process stream takes place in addition to the reforming reaction.

After autoignition, the temperature in the ATR reactor increases until a final operating temperature is reached. This is the end of the start-up phase, and the ATR is operated continuously under steady state conditions to produce syngas through autothermal reforming in a continuous manner.

According to an embodiment, the minimum hydrogen threshold concentration in the mixed stream is up to 15.0 mol-% on a wet basis. Preferably, the minimum hydrogen threshold concentration in the mixed stream is 1.0-15.0 mol-%, or 5.0-12.0 mol-%, or 5.5-9.5 mol-%, or 7.0 to 8.0 mol-%. In this context, "on a wet basis" means that the steam which forms part of the mixed stream at the upstream section of the ATR reactor is included.

According to an embodiment, the minimum outlet threshold temperature of the ATR reactor is between 500° C. to 650° C. As soon as the minimum threshold temperature of the ATR reactor is reached, the supply of inert gas is stopped, so that only steam is flowing continuously in the system. At this point, the hydrocarbon containing feed stream is introduced so that the steam reforming reaction in the ATR reactor can take place.

According to an embodiment, the fraction of the dry syngas stream is compressed by means of a gas compressor prior to being introduced into the ATR reactor. According to an embodiment, the hydrocarbon containing process stream is compressed by the gas compressor. In a preferred embodiment, both the fraction of the dry syngas stream and the hydrocarbon containing process stream are compressed by the same gas compressor. In one embodiment, said compressor comprises one suction nozzle each for the recycled dry syngas stream and the hydrocarbon containing process stream.

According to an embodiment, the fraction of the dry syngas stream is compressed by means of a steam ejector prior to being introduced into the ATR reactor. According to an embodiment, the hydrocarbon containing process stream is compressed by the steam ejector. In one embodiment, both the fraction of the dry syngas stream and the hydrocarbon containing process stream are compressed by a steam ejector. In one embodiment, said streams are compressed by the same steam ejector.

A steam ejector can be used as an alternative to a gas compressor. The use of a steam ejector, also referred to as steam jet compressor, reduces the energy consumption of the process in comparison to using gas compressors, in particular if costs for electrical energy are high.

In this context and in one further embodiment, the heated process steam is used as a motive fluid for the steam ejector. This can further reduce energy costs of the process, as the process steam supplied to the ATR reactor can also be used as driving steam for the ejector.

According to an embodiment, the fraction of dry syngas recycled from the downstream section of the ATR to the upstream section of the ATR is 40 to 70% of the volumetric flow of the dry syngas stream obtained. More preferred, the fraction of dry syngas recycled from the downstream section of the ATR to the upstream section of the ATR is 50 to 60% of the volumetric flow of the dry syngas stream obtained. In practice, the fraction of dry syngas recycled to the upstream section of the ATR is zero at the beginning of the process, and it is increased gradually as soon as production of synthesis gas from steam reforming in the ATR reactor begins. The amount of syngas recycled to the upstream section of the ATR reactor is increased gradually until a predetermined end value is reached, for instance according to the aforementioned preferred embodiment.

According to an embodiment, the fraction of dry syngas recycled to the upstream section of the ATR is 55 to 65% of the volumetric flow of the mixed process stream obtained at the upstream section of the ATR. In other words, the fraction of dry syngas in the mixed process stream is preferably 55 to 65% of the volumetric flow of the mixed process stream. Again, in practice, the fraction of dry syngas recycled to the upstream section of the ATR is zero at the beginning of the process, and it is increased gradually as soon as production of synthesis gas from steam reforming in the ATR reactor begins. The amount of syngas recycled to the upstream section of the ATR reactor is increased gradually until a predetermined end value is reached, for instance according to the aforementioned preferred embodiment.

According to an embodiment, the heating means is chosen from the list of elements comprising a fired heater, an electrical heater, a steam reformer or a combination thereof. In one embodiment, the waste heat of a steam reformer, in particular waste heat obtained from flue gases of the burners used in steam reforming, is used. When syngas is produced by a combination of autothermal reforming and "pure" steam reforming, also referred to as "combined reforming", the heat integration of the process is further improved if waste heat from the steam reforming part of the combined reforming process is used for one or more of the heating means.

According to an embodiment, the mixed process stream is heated to 500 to 650° C. before introducing it to the main burner of the ATR reactor.

According to an embodiment, the ATR reactor is operated at 950° C. to 1050° C. after autoignition to produce syngas through autothermal reforming.

According to an embodiment, the ATR is operated in series with a steam reformer, whereby syngas is produced by the ATR through autothermal reforming, and syngas is produced by the steam reformer through steam reforming. As mentioned before, the combination of steam reforming and autothermal reforming according to said embodiment of the process is also referred to as combined reforming.

According to an embodiment, wherein the autothermal reforming process is used in combination with steam reforming (i.e. combined reforming), the syngas produced by the steam reformer is added to the upstream section of the ATR, whereby the mixed process stream contains the process steam, the hydrocarbon containing process stream, the recycled dry syngas stream and the added syngas produced by the steam reformer. Either the syngas produced by the steam reformer in total or at least a fraction of it is added to the upstream section of the ATR. In an embodiment, the ATR is located downstream to the steam reformer.

In an example, when combined reforming is used, the minimum hydrogen threshold concentration is up to 50.0 mol-% on a wet basis. In case an autothermal reformer is operated in series to a steam reformer, the hydrogen fraction in the mixed process stream can be increased by adding a fraction of the syngas produced by the steam reformer. Thereby, autoignition of the mixed process stream after addition of oxygen is further facilitated.

In general, the problem underlying the invention is also at least partially solved by a plant configured to carry out the process according to one of the aforementioned embodiments.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

In the figures and the accompanying description, equivalent elements are each provided with the same reference marks.

Figure 1:
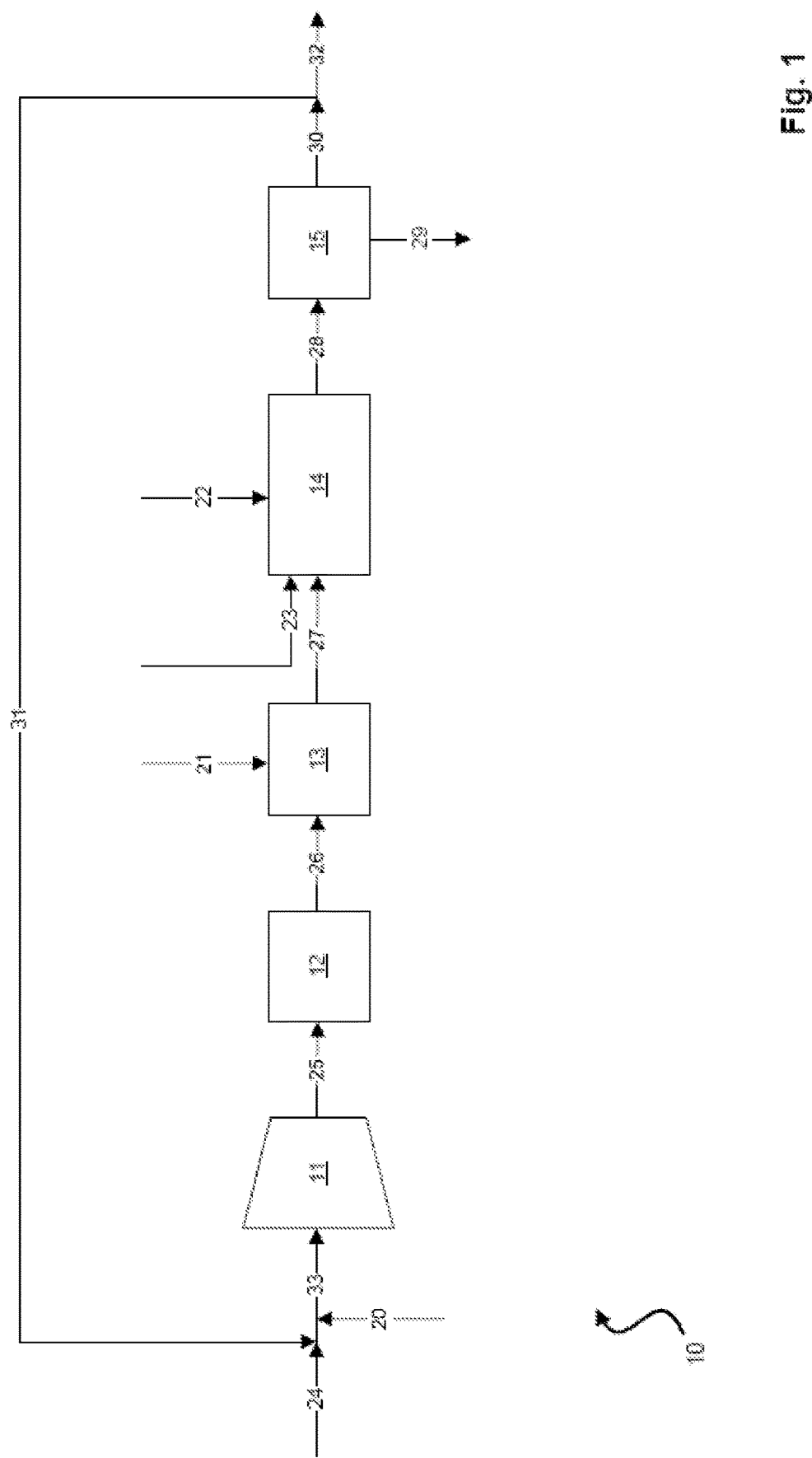
FIG. 1 depicts a simplified schematic representation of a process or plant 10 according to a first embodiment of the invention and FIG. 2 depicts a simplified schematic representation of a process or plant 20 according to a second embodiment of the invention.

FIG. 1 shows a simplified schematic of a first specific embodiment of the invention. The process or plant 10 comprises a circulation loop, which comprises a gas compressor 11, a desulphurisation unit 12, a pre-reformer 13, an autothermal reformer 14, the autothermal reformer 14 comprising an ATR reactor and a burner (not shown), and a cooling unit 15, whereby the aforementioned elements are fluidly interconnected. Nitrogen is introduced to the circulation loop via conduit 20, process steam via conduits 21 and 22, oxygen via conduit 23 and a natural gas (feedstock) stream via conduit 24.

In an initial process step, nitrogen as an inert carrier gas is pre-heated by a fired heater (not shown) and introduced to the circulation loop via conduit 20. The circulation loop is entirely flushed with nitrogen, before process steam, pre-heated by a fired heater (not shown) is introduced via conduit 22 to autothermal reformer 14. Thereby a heated mixture of process steam and nitrogen in the circulation loop results. As soon as a minimum outlet threshold temperature of the ATR reactor of the autothermal reformer 14 is reached, such as 500° C. or more, supply of nitrogen is stopped. As a result, nitrogen is removed gradually from the circulation loop, whereby pure steam remains in the system in the final analysis.

In a subsequent step, natural gas as the hydrocarbon containing process stream, pre-heated by a fired heater (not shown), is introduced via conduit 24 and subsequently compressed by gas compressor 11 to e.g. 30 bar. The compressed natural gas is sent to desulphurisation unit 12 via conduit 25. In the desulphurisation unit 12, sulphur containing contaminants of natural gas are hydrogenated to convert said contaminants to hydrogen sulfide ($H_2S$). The hydrogen sulfide is subsequently eliminated by absorption to a ZnO fixed bed contained in the desulphurisation unit. The desulphurised, i.e. cleaned natural gas is then sent via conduit 26 to pre-reformer 13, to which process steam is supplied via conduit 21. In the pre-reformer 13, higher hydrocarbons of the cleaned natural gas are pre-reformed and reacted with steam to obtain a natural gas stream which mainly contains methane as the hydrocarbon source. The pre-reformed natural gas is then sent to autothermal reformer 14 via conduit 27.

The ATR reactor of the autothermal reformer 14 comprises a Ni based catalyst bed, where the compressed and cleaned pre-reformed natural gas is mixed with process steam supplied via conduit 22, and thus converted to synthesis gas. The synthesis gas thereby obtained at the outlet of the ATR reactor is sent to cooling unit 15 via conduit 28 to separate excess, i.e. not reacted water. The condensed water is discharged via conduit 29.

A fraction of the dry synthesis gas obtained in the cooling unit and discharged via conduit 30 is recycled via conduit 31 to an upstream section of the ATR reactor. Remaining synthesis gas, which is not recycled to an upstream section of the autothermal reformer 14, is discharged via conduit 32 and is sent to flare.

In the embodiment according to FIG. 1, the upstream section of the ATR reactor is before (upstream to) the gas compressor 11, where the dry synthesis gas is mixed with natural gas of conduit 24 to form a mixture of natural gas and synthesis gas in conduit 33, which subsequently passes the gas compressor 11, the desulphurisation unit 12 and the pre-reformer 13. The compressed, desulphurised and pre-reformed mixture of natural and synthesis gas is supplied to autothermal reformer 14 via conduit 27, and steam is added via conduit 22 so that a mixed process stream containing the process steam, the hydrocarbon containing process stream and recycled dry synthesis gas is introduced to the ATR reactor of the autothermal reformer 14. As soon as a minimum hydrogen threshold concentration in the mixed stream at an upstream section of the ATR reactor is reached, oxygen is supplied to the burner of the ATR reactor of autothermal reformer 14, by what autoignition of the mixed process stream in the autothermal reformer 14 is obtained. The minimum hydrogen threshold concentration at an upstream section of the ATR reactor according to the embodiment of FIG. 1 is the hydrogen concentration in the mixed stream obtained by the streams of conduits 27 and 22.

After adding oxygen to the mixed process stream and autoignition of said process stream, synthesis gas is produced in the autothermal reformer 14 through autothermal reforming.

Figure 2:
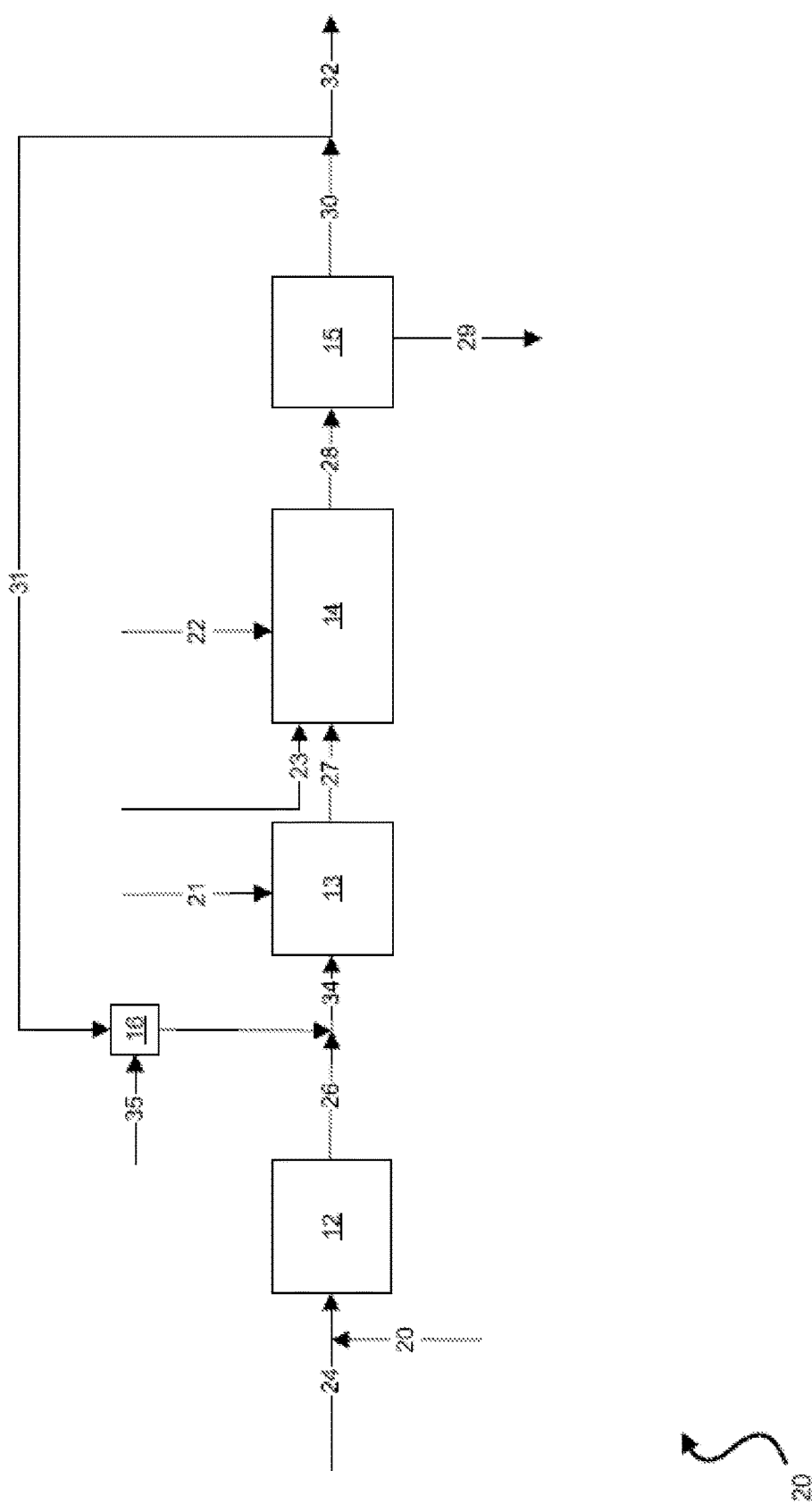

The embodiment according to FIG. 2 differs from the embodiment of FIG. 1 in that a steam ejector 16 for compressing a mixture of already desulphurised natural gas (of conduit 26) and recycled dry synthesis gas (of conduit 31) is used. A mixture of recycled dry syngas and natural gas is obtained in conduit 34, which is sent to pre-reformer 13 for further processing as described for the embodiment of FIG. 1. The steam reformer supplied with steam via conduit 35 as motive fluid. The steam used as a motive fluid can also be used, advantageously, as process steam (conduits 21 and/or conduit 22).

In the following numerical example (table), typical compositions and flow rates of the different streams of the foregoing embodiments are presented.

| | | Natural gas (cond. 24) | Recycle stream (cond. 31) | Natural gas + recycle stream (cond 33) | Outlet pre-reformer (cond. 27) | Inlet to ATR (cond. 27 + 22) | Outlet of ATR (cond. 28) | dry syngas (cond. 30) |
|---|---|---|---|---|---|---|---|---|
| Water | mol-frac. | 0.000 | 0.003 | 0.002 | 0.441 | 0.493 | 0.477 | 0.003 |
| $CO_2$ | mol-frac. | 0.014 | 0.069 | 0.048 | 0.027 | 0.024 | 0.036 | 0.069 |
| CO | mol-frac. | 0.000 | 0.004 | 0.003 | 0.001 | 0.001 | 0.002 | 0.004 |
| $H_2$ | mol-frac. | 0.000 | 0.236 | 0.144 | 0.081 | 0.073 | 0.124 | 0.236 |
| Ar | mol-frac. | 0.000 | 0.000 | 0.000 | 0.000 | 0.000 | 0.000 | 0.000 |
| $N_2$ | mol-frac. | 0.002 | 0.001 | 0.002 | 0.001 | 0.001 | 0.001 | 0.001 |
| $CH_4$ | mol-frac. | 0.968 | 0.686 | 0.796 | 0.446 | 0.404 | 0.360 | 0.686 |
| molar flow | kmol/hr | 1320.0 | 2071.3 | 3391.3 | 6056.6 | 6676.0 | 7316.9 | 3835.7 |
| mass flow | kg/hr | 22082.0 | 30552.0 | 52634.0 | 100646.3 | 111805.2 | 119305.2 | 56577.9 |

According to the numerical example, the hydrogen threshold concentration in the mixed stream (conduits 27+22, inlet to ATR) is 7.3 mol-% on a wet basis to achieve autoignition after admixture of oxygen via conduit 23.

LIST OF REFERENCE SIGNS

10, 20 process/plant
11 gas compressor
12 desulphurisation unit
13 pre-reformer
14 autothermal reformer
15 cooling unit
16 steam ejector
20-35 conduit

What is claimed is:
1. A process for the start-up of an autothermal reformer, the autothermal reformer comprising an autothermal reformer reactor with a burner, the process comprising:
heating an inert gas by an inert gas heating means, and introducing the heated inert gas in a circulation loop containing the autothermal reformer reactor;
heating a mixture of inert gas and process steam by a mixture heating means, and introducing the heated mixture of inert gas and process steam in the circulation loop containing the autothermal reformer reactor;
introducing heated process steam in the circulation loop as soon as a minimum outlet threshold temperature of the autothermal reformer reactor is reached, wherein inert gas is removed from the circulation loop;
heating a hydrocarbon containing process stream by a hydrocarbon stream heating means, and introducing the heated hydrocarbon containing process stream into the autothermal reformer reactor, whereby a syngas stream containing carbon oxides and hydrogen is produced in the autothermal reformer reactor through steam reforming;
cooling the produced syngas stream to separate water from the syngas stream as process condensate, whereby a dry syngas stream is obtained;
recycling a fraction of the dry syngas stream from a downstream section of the autothermal reformer reactor to an upstream section of the autothermal reformer reactor; whereby a mixed process stream is obtained at the upstream section of the autothermal reformer reactor, the mixed process stream containing the process steam, the hydrocarbon containing process stream and the recycled dry syngas stream;

introducing the mixed process stream to the burner of the autothermal reformer reactor;

introducing an oxygen containing process stream to the burner of the autothermal reformer reactor as soon as a minimum hydrogen threshold concentration in the mixed process stream at the upstream section of the autothermal reformer reactor is reached; whereby autoignition of the mixed process stream is obtained; and operating the autothermal reformer to produce syngas through autothermal reforming.

2. The process according to claim 1, wherein the minimum hydrogen threshold concentration in the mixed process stream is up to 15.0 mol-% on a wet basis.

3. The process according to claim 1, wherein the minimum outlet threshold temperature of the autothermal reformer reactor is between 500° C. to 650° C.

4. The process according to claim 1, wherein the fraction of the dry syngas stream is compressed by means of a gas compressor prior to being introduced into the autothermal reformer reactor.

5. The process according to claim 4, wherein the hydrocarbon containing process stream is compressed by the gas compressor.

6. The process according to claim 1, wherein the fraction of the dry syngas stream is compressed by means of a steam ejector prior to being introduced into the autothermal reformer reactor.

7. The process according to claim 6, wherein the hydrocarbon containing process stream is compressed by the steam ejector.

8. The process according to claim 6, wherein the heated process steam is used as a motive fluid for the steam ejector.

9. The process according to claim 1, wherein the fraction of dry syngas recycled from the downstream section of the autothermal reformer reactor to the upstream section of the ATR is 40 to 70% of the volumetric flow of the dry syngas stream.

10. The process according to claim 1, wherein the fraction of dry syngas recycled to the upstream section of the autothermal reformer reactor is 55 to 65% of the volumetric flow of the mixed process stream obtained at the upstream section of the ATR.

11. The process according to claim 1, wherein the mixed process stream is heated to 500 to 650° C. before introducing it to the main burner of the autothermal reformer reactor.

12. The process according to claim 1, wherein the autothermal reformer reactor is operated at 950° C. to 1050° C. after autoignition to produce syngas through autothermal reforming.

13. The process according to claim 1, wherein the autothermal reformer is operated in series with a steam reformer, whereby syngas is produced by the autothermal reformer through autothermal reforming, and syngas is produced by the steam reformer through steam reforming.

14. The process according to claim 13, wherein the syngas produced by the steam reformer is added to the upstream section of the autothermal reformer, whereby the mixed process stream contains the process steam, the hydrocarbon containing process stream, the recycled dry syngas stream and the added syngas produced by the steam reformer.

* * * * *